United States Patent [19]

Heitzmann et al.

[11] Patent Number: 4,640,715

[45] Date of Patent: Feb. 3, 1987

[54] MINERAL BINDER AND COMPOSITIONS EMPLOYING THE SAME

[75] Inventors: Richard E. Heitzmann, Pearland; Mark Fitzgerald, Houston; James L. Sawyer, Friendswood, all of Tex.

[73] Assignee: Lone Star Industries, Inc., Greenwich, Conn.

[21] Appl. No.: 708,732

[22] Filed: Mar. 6, 1985

[51] Int. Cl.⁴ .............................................. C04B 7/00
[52] U.S. Cl. ........................................ 106/85; 106/76; 106/84; 106/89; 106/315
[58] Field of Search ............... 106/76, 85, 89, 315, 106/84

[56] References Cited

U.S. PATENT DOCUMENTS

| | | | |
|---|---|---|---|
| 4,160,674 | 7/1979 | Sawyer | 106/89 |
| 4,349,386 | 9/1982 | Davidovits | 106/85 |
| 4,472,199 | 9/1984 | Davidovits | 106/85 |
| 4,509,985 | 4/1985 | Davidovits et al. | 106/85 |

*Primary Examiner*—William R. Dixon, Jr.
*Assistant Examiner*—Steven Capella
*Attorney, Agent, or Firm*—McAulay, Fields, Fisher, Goldstein & Nissen

[57] ABSTRACT

A dry, mineral binder composition is disclosed having from 6 to 25 parts by weight metakaolin, 3 to 30 parts by weight dry potassium hydroxide, 0 to 18 parts by weight slag, 0 to 60 parts by weight of a material selected from the class consisting of fly ash, calcined shale, and calcined clay, and from 1 to 150 parts, by weight, of a finely divided silica, preferably an amorphous silica. The binder is particularly useful in combination with Portland cement for forming concrete compositions.

13 Claims, No Drawings

MINERAL BINDER AND COMPOSITIONS EMPLOYING THE SAME

BACKGROUND OF THE INVENTION

Portland cement has long been a standard building material. Over the years, various modifiers have been developed for Portland cement formulations to provide particular properties or advantages, such as more rapid curing, compatibility with and resistance to certain materials, varying strengths, etc. Frequently, the modified formulations have worked at cross purposes, so that a Portland cement formulation which initially cures more rapidly results in a final product with a lower strength, while the higher strength Portland cement formulations frequently cannot be demolded for substantial periods of time because there is not sufficient early strength.

In the past few years, geopolymers have been found which, though mineral in composition, provide many of the properties of molding resins, such as epoxies and polyurethanes. Such geopolymers are described and claimed, for example, in U.S. Pat. Nos. 4,349,386 and 4,472,199, each in the name of Joseph Davidovits. These geopolymers are primarily composed of silicas and aluminas, mixed and reacted in particular ways to provide the desired structure. While, in general, these geopolymers are perfectly adequate for the purposes intended, as such, they do not provide the types of strengths sought in a Portland cement composition.

The art has continued to seek a Portland cement composition which provides for utilization in standard situations, while providing both a high early strength and an ultimate, very high strength. In particular, compositions having a minimum strength of 4,000 psi at 4 hours, the release strength necessary for prestress work, have been sought.

BRIEF DESCRIPTION OF THE INVENTION

In accordance with the present invention, a mineral binder, which can be used in conjunction with Portland cements, has been developed. In particular, this mineral binder is dry, so that it can be prepared at a manufacturing facility and shipped to the point of use without the necessity for the additional weight provided by the water required for cure, or the Portland cement with which it might be mixed. In addition to being usable as a binder with Portland cement, it can be used as a binder for a variety of other materials, such as in place of plastic for granite chips and similar materials, or, directly, as a molding material. When employed as a binder, it can be polished.

The binder composition of the present invention includes, as essential components:
From about 6 to about 25 parts by weight metakaolin
From about 3 to 30 parts by weight dry potassium hydroxide
From about 3.5 to 18 parts by weight slag
From 0 to 60 parts by weight of one or more materials selected from fly ash, calcined shale, and calcined clay
From 1 to 150 parts by weight of a finely divided silica, preferably amorphous silica
In addition to the required materials set forth, other materials can be added to the composition as, for example, retarders commonly used in cement formulations, and various substitutions are also possible for the required materials.

When the binder described is used in conjunction with Portland cement, the binder is generally supplied as a one component, dry system, which is then mixed with the Portland cement before water is added. The ratio of Portland cement to the binder can vary from, on a weight ratio basis, 40:60 to 70:30.

When the mixture of binder and Portland cement is mixed with water and placed into a mold for curing at 150° F. to 195° F. temperature, demolding is generally possible within about four hours. Not only is this more rapid than with Portland cement, alone, but is also generally faster than the time within which the geopolymers previously referred to can be demolded, curing of the geopolymers normally requiring one to two days before demolding is possible.

While the binder-Portland cement compositions of the present invention frequently develop strengths of 4,000 psi, the strength needed in prestress work, within the four hours allotted, and such strengths are preferable, a strength of only about 1,000 to 1,500 psi is required for demolding in other situations and the partially cured cement or concrete is generally handleable at such a strength. Because of the components of the present invention, particularly the finely divided silica, cure continues for a substantial period of time, and ultimate strengths of as much as 13,000 to 15,000 psi are obtainable employing the binders of the present invention in combination with Portland cement.

DESCRIPTION OF THE PREFERRED EMBODIMENTS

The dry, mineral binder of the present invention has, as previously indicated, the following essential components:
6 to 25 parts by weight metakaolin
3 to 30 parts by weight dry potassium hydroxide
0 to 18 parts by weight slag
0 to 60 parts by weight fly ash, calcined shale, or calcined clay, or a combination of these materials
1 to 150 parts by weight of finely divided silica, preferably amorphous silica.

The metakaolin is employed, as shown, in an amount of from approximately 6 to 25 parts by weight. Preferably, the metakaolin is employed in the higher amounts within this range, from about 15 to 25 parts by weight. The metakaolin ($Al_2O_3.2SiO_2$) is obtained by dehydroxylating kaolinite by heating at temperatures above 500° C. until the characteristic crystal structure is destroyed. The optimum temperature range is 600° C. to 800° C.

As the mineral binder of the present invention is dry, the potassium hydroxide employed should be a dry powder, crystal, or pellet, and the final, dry binder must be protected from air prior to use. As indicated, the potassium hydroxide is employed in amounts of approximately 3 to 30 parts by weight; preferably, it is used in amounts of from about 5 to 12 parts by weight. If desired, sodium hydroxide can be substituted for the potassium hydroxide, on a weight basis. When caustic soda is used, rather than caustic potash, the freeze-thaw stability of the final material is not as good.

The slag employed in this binder, when used, can be Lone Star Miami ground sidmar slag which has the following characteristics:

| MIAMI PLANT GROUND SIDMAR SLAG | |
|---|---|
| Glass, % Microscope | 70 |
| $SiO_2$ | 32.83 |
| $Al_2O_3$ | 11.59 |
| $Fe_2O_3$ | 1.58 |
| CaO | 41.43 |
| MgO | 8.03 |
| $TiO_2$ | 0.55 |
| $Na_2O$ | 0.28 |
| $K_2O$ | 0.41 |
| SrO | 0.06 |
| $SO_3$ | 0.42 |
| S | 0.99 |
| Gain on Ignition | 0.86 |
| Corrected Loss | 1.12 |
| Hydraulic Index | |
| I | 1.86 |
| $I_H$ | 1.80 |

The slag can be employed in amounts of from about 0 to 18 parts by weight, preferably about 10 to 15 parts by weight. The slag is one of the materials which reacts and forms a part of the cured system upon the addition of water.

The binder composition calls for from 0 to 60 parts by weight of one or more of fly ash, calcined shale, or calcined clay. Preferably, the level of this material in the binder composition does not rise to 60 parts by weight, particularly when the binder is used in combination with Portland cement, as, with such a high amount, the ultimate concrete is not as strong. Preferably, the amount of the material selected from fly ash, calcined shale, and calcined clay is in the range of from about to 50 parts by weight, and most preferably about 20 to 30 parts by weight. These materials are somewhat reactive and participate in the curing reaction in the formation of the final product.

A major distinction between the binder of the present invention and the composition of the prior art is the use of finely divided silica, preferably amorphous silica. The amount of this material, as indicated, is in the range of from 1 to 150 parts by weight, preferably from about 30 to 100 parts by weight, most preferably from about 40 to 75 parts by weight. As indicated, the preferable finely divided silica is an amorphous silica and, of the amorphous silicas, silica fume is preferred. However, other amorphous silicas such as rice hull ash, and others known in the art, can be substituted.

The finely divided or amorphous silica, to the greatest extent, is a substitute for the sodium and potassium silicates of the materials of the prior art. It has been found that the use of these silicates in combination with Portland cements should, to a great extent, be avoided, because of the possibility of flash setting of the material, preventing desired workability. Additionally, the amorphous silicas are less expensive than the silicates and allow for continuing reaction of the materials so that the ultimate strength of the binder, or concrete when used in combination with Portland cement, is higher.

In preparing the binder of the present invention, the various dry components are merely mixed together and dry blended to form a homogenous mixture. This binder can then be transported to a site for use, either as such, or in combination with Portland cement. When used in combination with Portland cement, a further dry blending is accomplished, but substantial savings are realized because only the binder need be transported substantial distances, the Portland cement with which the binder is blended generally being available near the site.

Activation of either the binder, alone, or of the binder-Portland cement mixture is accomplished by the addition of water and appropriate admixtures. The ratio of Portland cement to the binder, in accordance with the present invention should be between 40:60 and 70:30, on a weight basis. Preferably, the mixtures with Portland cement include from about 55 to 65% Portland cement and from about 45 to 35% of the binder. In addition, substantial amounts of fly ash can be included with the Portland cement component, the amount of fly ash generally comprising about 20% of the overall composition, the ratio of Portland cement and binder being essentially the same as just set forth. These blends may be produced initially, or at the site.

In addition, other materials normally added to cement compositions, such as various admixtures, can be employed in the overall compositions. These admixtures or retarders include, without limitation, such materials as borax, citric acid, sugar, and various proprietary retarders, some of which will be identified in the specific formulations, below.

The following are given as examples of the formulations of the binder and binder-Portland cement compositions of the present invention. They should be considered only as illustrative and not as limiting, in any way, the full scope of the invention as covered in the appended claims. All parts, unless otherwise indicated, are by weight.

EXAMPLE 1

A binder in accordance with the present invention was prepared by mixing the following components in the ratios indicated:
20.1 parts metakaolin
10.9 parts slag.
25.2 parts fly ash
34 parts silica fume
9.8 parts dry potassium hydroxide The components listed were dry blended to a homogeneous mixture and could be employed as a binder for granite chips, such as for a terrazzo type of floor, as the binder would take a high polish after curing.

EXAMPLE 2

Concrete was prepared employing the binder of Example 1 and Portland cement, with other necessary materials, as indicated below:
258 parts binder of Example 1
387 parts Portland cement
1,020 parts sand
2,058 parts gravel
7 parts borax
7 parts citric acid
7 parts of a retarder sold by W. R. Grace and Co. under the name Daracem-100, a dispersion of sulfonated napthalene formaldehyde condensate, a gluconate, and a lignosulfonate
151 parts water The various materials were dry blended and the water and liquid admixture were then added until a complete mixture was obtained. The concrete was placed into molds and steam cured for 1½ hours. After 4 hours this concrete was found to have a compressive strength of 7,000 psi.

EXAMPLE 3

A binder was prepared with the following composition:
70 parts metakaolin
38.5 parts slag
63 parts of a mixture of fly ash, calcined shale, and calcined clay
154 parts silica fume
23.4 parts dry potassium hydroxide The composition was dry blended to homogenity. It was usable, as such, as a binder for hard, mineral materials.

EXAMPLE 4

The binder of Example 3 was combined with 353.8 parts Portland cement, 1,625 parts sand, and 271.2 parts water. When cured at 150° F. for 4 hours, the resulting concrete had a compressive strength of 3,570 psi; continued curing for 24 hours at 73° F. resulted in a compressive strength of 4,350 psi.

EXAMPLE 5

A binder was prepared with the following composition:
70 parts metakaolin
38.5 parts slag
63 parts of a mixture of fly ash, calcined shale, and calcined clay
142.4 parts silica fume
35 parts dry potassium hydroxide.

EXAMPLE 6

The binder of Example 5 was combined with 353.8 parts Portland cement, 1,625 parts sand, 7 parts borax, 7 parts citric acid, and 7 parts Daracem-100, and 206 parts water were added. When cured at 150° F. for 4 hours, the resulting concrete had a compressive strength of 3,650 psi; when curing was continued for 24 hours at 73° F. the resulting compressive strength was 5,630 psi.

EXAMPLE 7

A binder was prepared employing the same materials and amounts as in Example 5, except that 25 parts potassium hydroxide were employed rather than 35 parts, and 152.4 parts silica fume, rather than 142.4 parts.

EXAMPLE 8

The binder of Example 7 was employed with 353.8 parts cement, 1,625 parts sand, 7 parts borax, 7 parts citric acid, and 7 parts Daracem-100, along with 171 parts water. The composition was cured at 150° F. and showed a compressive strength of 3,900 psi at 4 hours and 6,270 psi at 24 hours.

EXAMPLE 9

A binder was formed employing the following materials in the amounts shown:
52.8 parts metakaolin
27.7 parts slag
48.7 parts fly ash
106.5 parts silica fume
26.3 parts dry potassium hydroxide.

EXAMPLE 10

The binder of Example 9 was combined with 395 parts Portland cement, 1,662 parts sand, 5.3 parts citric acid and 7.9 parts Daracem-100, along with 180 parts water. When cured at 150° F., a compressive strength of 2,080 psi was attained in 4 hours and 5,450 psi in 3 days.

EXAMPLE 11

A binder was prepared employing the same materials and amounts as in Example 9, except that 61.9 parts fly ash were employed in place of 48.7 parts, 95.9 parts silica fume were employed in place of 106.5 parts, and 23.7 parts potassium hydroxide were employed in place of 26.3 parts.

EXAMPLE 12

Employing the binder of Claim 11, with the additional materials as set forth in Claim 10, a compressive strength of 2,250 psi was obtained in 4 hours and 6,830 psi in 3 days.

EXAMPLE 13

A binder was prepared in the same manner as in Example 9, except that 75.3 parts fly ash were employed in place of 48.7 parts, 85.2 parts silica fume were employed in place of 106.5 parts, and 21 parts potassium hydroxide were employed in place of 26.3 parts.

EXAMPLE 14

A mortar was prepared in the same manner as in Example 10, employing the same additive, but using the binder of Example 13. When cured at 150° F., a compressive strength of 2,470 psi was obtained in 4 hours and 7,100 psi in 3 days.

EXAMPLE 15

A binder composition was prepared with the following:
52.5 parts metakaolin
28 9 parts slag
47.2 parts fly ash
88.9 parts silica fume
30 4 parts potassium hydroxide.

EXAMPLE 16

A mortar formulation was prepared employing the binder of Example 15 along with 437.5 parts Portland cement, parts fly ash, 5.2 parts borax, 8.2 parts citric acid, 12.3 parts Daracem-100, 1,625 parts sand, and the compositions were blended and mixed with 221.8 parts water.

Two different batches were prepared and cured at 150° F. for four hours. The first batch showed a compressive strength of 2,630 psi in 4 hours and 4,280 psi in 24 hours, while the second batch showed a compressive strength of 4,850 psi in hours and 7,650 psi in 24 hours.

EXAMPLE 17

A binder composition was prepared with the following components:
52.5 parts metakaolin
28.9 parts slag
47.2 parts fly ash
73.3 parts silica fume
24 parts dry potassium hydroxide.

EXAMPLE 18

A Portland cement composition mixture was prepared containing the following:
437.5 parts cement
175 parts fly ash
5.2 parts borax 8.2 parts citric acid
12.3 parts Daracem-100
1,625 parts sand.

EXAMPLE 19

Two batches were prepared employing the binder of Example 17 and the cement composition of Example 18 and employing parts water. Each was cured at 150° F., the first showing a compressive strength in 4 hours of 2,530 psi and 4,200 psi in hours, while the second batch showed 3,770 psi in 4 hours and 6,470 psi in 24 hours.

EXAMPLE 20

A binder was prepared with the following composition:
52.5 parts metakaolin
23.9 parts slag
52.2 parts fly ash
73.3 parts silica fume
24 parts dry potassium hydroxide.

EXAMPLE 21

The binder of Example 20 was combined with the cement composition of Example 18 and cured, with 186 parts water, at ° F The resulting concrete had a compressive strength of 4,550 psi in 4 hours and 6,800 psi in 24 hours.

EXAMPLE 22

A binder was prepared with the following components:
52.5 parts metakaolin
18.9 parts slag
57.2 parts fly ash
73.3 parts silica fume
24 parts dry potassium hydroxide.

EXAMPLE 23

The binder of Example 22 was combined with the cement composition of Example 18 and cured, with 186 parts water at 150° F. It showed a compressive strength at 4 hours of 6,930 psi, at 24 hours of 8,080 psi. When cured at ambient temperature for 24 hours, the compressive strength was 2,750 psi.

EXAMPLE 24

A binder composition was prepared with the following components:
52.5 parts metakaolin
13.9 parts slag
62.2 parts fly ash
73.3 parts silica fume
24 parts dry potassium hydroxide.

EXAMPLE 25

The binder of Example 24 was combined with the cement composition of Example 18 and cured at 150° F. with 186 parts water. After 4 hours, the concrete had a compressive strength of 5,350 psi, with a compressive strength of 6,820 psi at 24 hours.

EXAMPLE 26

A binder composition was prepared containing the following:
52.5 parts metakaolin
76.1 parts fly ash
73.3 parts silica fume
24 parts dry potassium hydroxide.

EXAMPLE 27

The binder of Example 26 was combined with the cement composition of Example 18 and cured at 150° F. along with 186 parts water. The compressive strength after 4 hours was 6,280 psi, and was 7,680 psi after 24 hours.

EXAMPLE 28

A binder was prepared with the following components:
52.5 parts metakaolin
28.9 parts slag
35.2 parts fly ash
85.3 parts silica fume
24 parts dry potassium hydroxide.

EXAMPLE 29

The binder of Example 28 was combined with the cement composition of Example 18 and cured at 150° F. employing 186 parts water. The resulting mortar had a compressive strength of 2,480 psi at 4 hours and 6,550 psi at 3 days.

EXAMPLE 30

The binder composition was prepared with the following components:
52.5 parts metakaolin
28.9 parts slag 1,
23.2 parts fly ash
97.3 parts silica fume
24 parts dry potassium hydroxide.

EXAMPLE 31

The binder composition of Example 30 was combined with the cement composition of Example 18 and cured at 150° F. with parts water. The resulting concrete had a compressive strength of 2,970 psi at 4 hours and 7,250 psi at 3 days.

EXAMPLE 32

A binder composition was prepared with the following components:
52.5 parts metakaolin
28.9 parts slag
11.2 parts fly ash
109.3 parts silica fume
24 parts dry potassium hydroxide.

EXAMPLE 33

The binder composition of Example 32 was combined with the cement composition of Example 18 and cured at 150° F. along with 186 parts water. The resulting mortar had a compressive strength of 3,050 psi at 4 hours and 7,530 psi at 3 days.

EXAMPLE 34

A binder composition was prepared with the following components:
52.5 parts metakaolin
28.9 parts slag
120.5 parts silica fume
24 parts dry potassium hydroxide.

EXAMPLE 35

The binder of Example 34 was combined with the cement composition of Example 18 and cured at 150° F. along with 186 parts water. The resulting material showed a compressive strength of 7,050 psi at 4 hours and 9,220 psi at 3 days.

EXAMPLE 36

A binder composition was prepared containing the following components:
52.5 parts metakaolin
18.9 parts slag
126.5 parts silica fume
28 parts dry potassium hydroxide.

EXAMPLE 37

The binder composition of Example 36 was combined with the cement composition of Example 18 and cured at 150° F. with 186 parts water. The resulting concrete had a compressive strength of 7,700 psi at 4 hours and 8,950 psi at 3 days.

EXAMPLE 38

A binder composition was prepared containing the following components:
52.5 parts metakaolin
18.9 parts slag
126.5 parts silica flour
28 parts dry potassium hydroxide.

EXAMPLE 39

The binder composition of Example 38 was combined with the cement composition of Example 18 and cured at 150° F. with 196 parts water. The resulting mortar had a compressive of 3,570 psi at 4 hours and 6,200 psi at 3 days.

EXAMPLE 40

A binder composition was prepared containing the following components:
52 parts metakaolin
12 parts slag
46 parts fly ash
75 parts silica fume
26 parts dry potassium hydroxide.

EXAMPLE 41

Concrete was prepared employing the binder of Example 40 and Portland cement, fly ash, and other necessary materials, as indicated below.
211 parts binder of Example 40
353 parts Portland cement
141 parts fly ash
1102 parts sand
2046 parts gravel
5 parts borax
8 parts citric acid
10 parts Daracem-100
147 parts water.

The various dry materials were dry blended and the water and liquid admixture were then added until a complete mixture was obtained. The concrete was placed into molds and steam cured for 1 hr. to 1 ½ hr. and then cured at ambient (73° F.) temperatures. After 1 hour this concrete was found to have a compressive strength of 1670 psi., 7000 psi. at 2 hrs., 8300 psi. at 4 hrs. and 9550 psi. at 28 days. When the concrete was cured at 73° F. without the initial steam curing it had a compressive strength of 2500 psi. at 24 hrs., 4480 psi. at 3 days, 7000 psi. at 7 days and 10,900 psi. at 28 days.

EXAMPLE 42

A binder composition was prepared containing the following components:
52.3 parts metakaolin
18.9 parts slag
57.2 parts fly ash
73.3 parts silica fume
24.0 parts dry potassium hydroxide.

EXAMPLE 43

Concrete was prepared employing the binder of Example 42 and Portland cement, fly ash and other necessary materials as indicated below:
211 parts binder of Example 42
353 parts Portland cement
141 parts fly ash
1102 parts sand
2046 parts gravel
5 parts borax
8 parts citric acid
10 parts Daracem-100
152 parts water.

The various dry materials were dry blended and the water and liquid admixture were then added until a complete mixture was obtained. The concrete was placed into molds and steam cured for 1 to 1½ hrs. After 1 hour this concrete was found to have a compressive strength of 3500 psi., 6000 psi. at 2 hrs., 6700 psi. at 4 hrs. and 9400 psi. at 28 days. When the concrete was cured at 73° F. it had a compressive strength of 1100 psi. at 4 hrs., 2300 psi. at 24 hrs., 4000 psi. at 3 days, 9000 psi. at 7 days and 11,000 psi. at 28 days.

Thus, in accordance with the present invention, a composition has been given for a dry, mineral binder for varying uses. The binder can be used for various mineral materials, and can be blended with Portland cement to form a concrete composition with high early strength, suitable for early demolding and early use.

The invention should not be considered as limited by the specific examples shown, but only as set forth in the appended claims.

What is claimed as new is:

1. A dry, mineral binder composition for binding mineral materials comprising:
   from about 6 to 25 parts by weight metakaolin
   from about 3 to 30 parts by weight dry potassium hydroxide
   from 0 to 18 parts by weight slag
   from 0 to 60 parts by weight of at least one material selected from the class consisting of fly ash, calcined shale, and calcined clay
   from 1 to 150 parts of an amorphous silica.

2. The composition of claim 1 wherein the amorphous silica is silica fume.

3. The composition of claim 1 wherein the amount of amorphous silica is from 30 to 100 parts by weight.

4. The composition of claim 3 wherein the amount of amorphous silica is from 40 to 75 parts by weight.

5. The composition of claim 1 wherein the material selected from the class consisting of fly ash, calcined shale, and calcined clay is fly ash.

6. The composition of claim 5 wherein the amount of fly ash is from 15 to 50% parts.

7. The composition of claim 6 wherein the amount of fly ash is from 20 to 30 parts, by weight.

8. The composition of claim 1 wherein the amount of metakaolin is from 15 to 25 parts by weight.

9. A concrete composition employing from 30 to 60 parts by weight of the binder of claim 1 and from 70 to 40 parts by weight Portland cement.

10. The composition of claim 11 wherein a portion of the Portland cement is replaced with fly ash.

11. The composition of claim 11 having from 55 to 65% Portland cement and from 45 to 35% of the binder of claim 1.

12. The composition of claim 11 having, in addition, 20%, based upon the overall weight, of fly ash.

13. A dry, mineral binder composition for binding mineral materials comprising:
   from about 6 to 25 parts by weight metakaolin
   from 3 to 30 parts by weight dry sodium hydroxide
   from 0 to 18 parts by weight slag
   from 0 to 60 parts by weight of at least one material selected from the class consisting of fly ash, calcined shale, and calcined clay
   from 1 to 150 parts of an amorphous silica.

* * * * *